(12) United States Patent
Socek et al.

(10) Patent No.: US 8,189,664 B2
(45) Date of Patent: May 29, 2012

(54) METHODS FOR ENCRYPTING AND COMPRESSING VIDEO

(75) Inventors: Daniel Socek, Boca Raton, FL (US); Hari Kalva, Delray Beach, FL (US); Spyros Magliveras, Boynton Beach, FL (US)

(73) Assignee: Florida Atlantic University, Boca Raton, FL (US)

( * ) Notice: Subject to any disclaimer, the term of this patent is extended or adjusted under 35 U.S.C. 154(b) by 1340 days.

(21) Appl. No.: 11/804,709

(22) Filed: May 18, 2007

(65) Prior Publication Data

US 2007/0291941 A1 Dec. 20, 2007

Related U.S. Application Data

(60) Provisional application No. 60/801,670, filed on May 18, 2006.

(51) Int. Cl.
*H04N 11/04* (2006.01)

(52) U.S. Cl. ......... 375/240.12; 375/240.02; 375/240.01; 375/240.13; 375/240.15; 375/240.16; 348/384.1; 348/394.1; 348/402.1; 348/409.1; 380/214; 380/216; 380/217; 380/200

(58) Field of Classification Search .......... None
See application file for complete search history.

(56) References Cited

U.S. PATENT DOCUMENTS

| | | | |
|---|---|---|---|
| 5,436,985 A | 7/1995 | Li | 382/253 |
| 5,917,835 A | 6/1999 | Barrett et al. | 371/37.4 |
| 6,198,770 B1 * | 3/2001 | Kondo | 375/240.14 |
| 6,314,137 B1 * | 11/2001 | Ono et al. | 375/240 |
| 6,459,794 B1 | 10/2002 | DeVito et al. | 380/210 |
| 6,850,559 B1 * | 2/2005 | Driessen et al. | 375/219 |
| 6,870,907 B1 * | 3/2005 | Nakatsuyama | 379/88.14 |
| 7,200,562 B2 * | 4/2007 | Suguta et al. | 704/500 |
| 7,356,831 B2 * | 4/2008 | Nathan | 725/92 |
| 7,448,057 B1 * | 11/2008 | Nathan | 725/5 |
| 7,555,208 B2 * | 6/2009 | Noda | 386/239 |
| 7,631,094 B1 * | 12/2009 | Motoyama | 709/231 |
| 7,697,036 B2 * | 4/2010 | Omata | 348/220.1 |
| 7,749,083 B2 * | 7/2010 | Nathan et al. | 463/42 |
| 7,848,580 B2 * | 12/2010 | Horie et al. | 382/232 |
| 8,000,391 B2 * | 8/2011 | Tanaka et al. | 375/240.16 |
| 2003/0138046 A1 * | 7/2003 | Base et al. | 375/240.12 |

(Continued)

FOREIGN PATENT DOCUMENTS

WO WO 9854841 A1 * 12/1998

OTHER PUBLICATIONS

Permutation-based data compression; Mihnea, Amalya. ProQuest Dissertations and Theses 2011. vol. 0364,Iss.0119;p. n/a Source: ProQuest Dissertations and Theses.*

(Continued)

*Primary Examiner* — Syed A. Zia
(74) *Attorney, Agent, or Firm* — Martin Novack (57) ABSTRACT

A method for compressing and transmitting a sequence of video frames represented by arrays of digital pixel values includes the following steps: transmitting a representation of a first frame ($I_1$) of the sequence; deriving a sorting permutation $P_1$ of the first frame; using the sorting permutation of the first frame, $P_1$, to approximately sort a second frame ($I_2$) of the sequence, to obtain approximately sorted frame $P_1(I_2)$; and compressing and transmitting the approximately sorted frame $P_1(I_2)$.

33 Claims, 4 Drawing Sheets

U.S. PATENT DOCUMENTS

| | | | |
|---|---|---|---|
| 2004/0170330 A1 | 9/2004 | Fogg | 382/232 |
| 2005/0084012 A1 | 4/2005 | Hsu et al. | 375/240.12 |
| 2005/0111743 A1* | 5/2005 | Kong et al. | 382/236 |
| 2007/0291941 A1* | 12/2007 | Socek et al. | 380/214 |

OTHER PUBLICATIONS

D. Socek, S. Magliveras, D. Culibrk, O. Marques, H. Kalva, and B. Furht, "Digital Video Encryption Algorithms Based on Correlation-Preserving Permutations," Proceedings of the International Conference on Image Analysis and Recognition ICIAR 2006, Povoa De Varzim, Portugal, Sep. 2006, EURASIP Journal on Information Security, vol. 2007, Article ID 52965, pp. 1-15, 2007.

Daniel Socek, Hari Kalva, and Spyros S. Magliveras, Oge Marques, Dubravko Culibrk, and Borko Furht "A Permutation-Based Correlation-Preserving Encryption Method for Digital Videos", Proceedings of the International Conference on Image Analysis and Recognition ICIAR 2006, Lecture Notes in Computer Sciences, 2006, No. 4141, pp. 547-558.

Daniel Socek, Hari Kalva, Spyros S. Magliveras, Oge Marques, Dubravko Culibrk, and Borko Furht "New Approaches to Encryption and Steganopraphy for Digital Videos", Multimedia Systems Journal, vol. 13, No. 3, Sep. 2007, pp. 191-204.

Shujun Li, Chengqing Li, Guanrong Chen and Nikolaos G. Bourbakis, "A General Cryptanalysis of Permutation-Only Multimedia Encryption Algorithms", IACR's Cryptology ePrint Archive: Report 2004/374, 2004.

* cited by examiner $I_1$  
Fig. 1A $I_2$  
Fig. 1B $I_3$  
Fig. 1C $\sigma_1(I_2)$  
Fig. 2D $\sigma_2(I_3)$  
Fig. 2E

METHODS FOR ENCRYPTING AND COMPRESSING VIDEO

RELATED APPLICATION

Priority is claimed from U.S. Provisional Patent Application No. 60/801,670, filed May 18, 2006, and said U.S. Provisional Patent Application is incorporated herein by reference.

FIELD OF THE INVENTION

This invention relates to the fields of video encryption and compression of sequences of image-containing frames.

BACKGROUND OF THE INVENTION

In most digital video security architecture, video encryption plays a key role in ensuring the confidentiality of the video transfer. However, conventional, general-purpose encryption algorithms (such as AES) are not suitable for video encryption in many digital video applications, mainly since these algorithms do not conform to various video application requirements that will be treated momentarily. In order to overcome this problem, a significant number of video encryption algorithms specifically designed for digital videos have been proposed.

In general, applying a well-established, general-purpose, symmetric-key encryption algorithm to a video sequence is a good idea from a security point of view. However, there are applications with requirements that are not supported with conventional encryption methods. Thus, the encryption algorithms specifically designed to support these requirements are desirable. These aspects include the following: (1) level of security and perception, (2) minimum bitrate, (3) formal-compliance, (4) degree of bitstream expansion, and (5) error-tolerance.

To identify an optimal level of security, one can compare the cost of the multimedia information to be protected versus the cost of the protection itself. If the digital video to be protected is not that valuable in the first place, it is sufficient to choose a relatively light level of encryption. On the other hand, if the media content is highly valuable or represents industrial, governmental or military secrets, the cryptographic security level must be of the highest degree. Lightweight encryption often called "degradation", may be sufficient for distributing the multimedia content of low value. Degradation usually intentionally preserves some perceptional information, but the visual quality is likely unacceptable for entertainment purposes. This type of encryption is referred to as "perceptual encryption". If the video contains sensitive industrial, governmental or military information, then the cryptographic strength must be substantial and no perceptual information should be preserved after encryption.

"Minimum bitrate" measures the minimal amount of data that must be received, decrypted and decoded per unit of time by the receiver in order to maintain a real time video playback. This is a function of available transmission bandwidth, the decoding time, and the decryption time. Thus, in many real-time video applications, it is imperative that the speed of decryption algorithm is fast enough to ensure the minimum bitrate needed for the normal video playback.

Additionally, in many applications it is desired that the encryption algorithm preserves the video compression format. In other words, after encrypting the encoded video, it is necessary that ordinary decoders can still decode it without crashing. This can be an important aspect in digital video broadcasting applications where an encrypted video is broadcast to all system users. This property of an encryption algorithm is often called "format-compliance" (also sometimes called "transparency", "transcodability" or "syntax-awareness"). When feeding the decoder with the format-compliant encrypted data, the produced output can seem distorted and randomized. If the encryption algorithm was lightweight (e.g. degradation), the output often gives out some perceptual hints about the original content. However, if the encryption level was substantial, the output usually gives no perceptual information about the original multimedia.

In many instances, it is also required that the encryption transformation preserves the size of a bitstream. This is known as the constant bitrate requirement. However, more often than not, it is simply preferred that the output produced by an encryption-equipped encoder and the output produced by an ordinary encoder have similar sizes. That is, the encryption stage is allowed to slightly increase the size of a bitstream. This is sometimes called a near constant bitrate. A near-constant bitrate is likely to occur when a block cipher is used for encryption, since in that case the encrypted output is always a multiple of the blocksize.

For many multimedia systems "error-tolerance", or "error-resilience", is of high importance. Since the real-time transport of multimedia data often occurs in noisy environments, which is especially true in the case of wireless channels, the delivered media is prone to bit errors. If a cipher possesses a strong avalanche property, the decryption will likely fail even if a single bit is flipped. The error-tolerance can be improved by applying some of the classical error-detecting or error-correcting codes. Unfortunately, these techniques are in many instances extremely costly to apply to an already bulky multimedia bitstream. Advanced video coding systems (such as H.264) have their own error correcting mechanisms. A video encryption algorithm that preserves these mechanisms is therefore favorable for video systems with noisy channels.

For the most part, modern cryptography is designed for a generic bitstream, and as such, it disregards the aforementioned properties of a digital video and the requirements of a typical digital video application. The following presents an overview of some of the video encryption algorithms that have been proposed, mainly to overcome application-related problems.

As the communication bandwidth and computing power of business and personal computers increased, video proliferated and demand for video encryption greatly increased. In general, there are two basic research initiatives regarding the encryption of digital videos: Selective encryption approaches and full encryption approaches. While full encryption approaches are designed to encrypt the entire video bitstream (raw or compressed), selective encryption approaches perform encryption only on certain, carefully selected parts of the video bitstream. Some selective encryption approaches have been broken as ways were found to exploit the information from unencrypted bits. Also, there has been difficulty in evaluating the security of selective encryption techniques.

Full encryption approaches essentially encrypt the entire multimedia data. Full approach is not to be confused with the so-called naïve approach, which is itself in a category of full encryption approaches. Naive approach often refers to a video encryption method that uses a conventional, general-purpose modern cryptosystem to encrypt the entire video bitstream. A "conventional cryptosystem" refers to a modern symmetric-key cryptosystem that is either one of the encryption standards (DES or AES), or a well-established general-purpose cryptosystem that was designed and evaluated by the reputable cryptographic experts, companies, or agencies. Full approaches that are not considered naïve are mostly systems that are specifically designed to encrypt a specific multimedia type of data. Those approaches take into consideration the performance and security aspects needed for an effective multimedia encryption. However, even though the full encryption approaches can in general be more properly evaluated for security, these methods may not be application-friendly when applied after compression. Encrypting the entire bitstream before compression would be more application-friendly since the compressed bitstream would then comply with the application requirements such as format-compliance or error-resilience. In addition this type of encryption does not require modification of encoder or decoder, which is a great benefit to systems with pre-installed hardware codecs. Unfortunately, performing traditional encryption procedure before compression tends to destroy the spatial and temporal redundancies present in the raw video data, which would make the subsequent video compression algorithm very inefficient.

One of the full video encryption approaches involved the use of fast 1-D, 2-D, or 3-D chaotic maps to achieve encryption. Chaos-based methods are considered promising due to their fast performance. In addition, these methods have good local and global confusion and diffusion, which is a desired property in the domain of digital video encryption. Although many chaotic encryption approaches were shown to be insecure, there are chaotic encryption algorithms that, to date, remain unbroken. Chaotic methods can be designed both as full and selective encryption approaches. Unfortunately, the application-related problems with full chaotic encryption algorithms are the same as that of the standard naïve approaches. For further description of chaos-based methods and other existing techniques, reference can be made to the background portion of D. Socek, H. Kalva, S. Magliveras, O. Marques, D. Culibrk, abd B. Furht, "A Permutation-Based Correlation Preserving Encryption Method for Digital Video," Proceedings of the International Conference on Image Analysis and Recognition ICIAR 2006, Povoa De Varzim, Portugal, September 2006, and also to references cited therein.

It is among the objects of the present invention to provide a technique that can be used for compressing and/or encrypting image sequences, while reducing or eliminating drawbacks of prior art techniques.

SUMMARY OF THE INVENTION

Encryption is usually a process that has a property to randomize the data. On the other hand, compression efficiency is directly dependant on the source data correlation. The more the data is correlated, the better the compression, and vice versa. One of the objectives hereof was to devise an encryption mechanism of reasonable security that preserves, or even improves, the redundancy of video data. One of the advantages of the present invention is that redundancy-preserving encryption is achieved.

A form of the present invention is directed to a method for compressing and transmitting a sequence of video frames represented by arrays of digital pixel values, including the following steps: transmitting a representation of a first frame $(I_1)$ of the sequence; deriving a sorting permutation $P_1$ of said first frame; using the sorting permutation of the first frame, $P_1$, to approximately sort a second frame $(I_2)$ of the sequence, to obtain approximately sorted frame $P_1(I_2)$; and compressing and transmitting the approximately sorted frame $P_1(I_2)$. Further steps of this embodiment include: deriving a sorting permutation $P_2$ of said second frame; using the sorting permutation of the second frame, $P_2$, to approximately sort a third frame $(I_3)$ of the sequence, to obtain approximately sorted frame $P_2(I_3)$; and compressing and transmitting the approximately sorted frame $P_2(I_3)$. In this embodiment, further steps include: deriving a sorting permutation $P_n$ of an $n^{th}$ frame of the sequence; using the sorting permutation of the $n^{th}$ frame, $P_n$, to approximately sort an $(n+1)^{th}$ frame $(I_{n+1})$ of the sequence; and compressing and transmitting the approximately sorted frame $P_n(I_{n+1})$.

A preferred embodiment of this form of the invention further comprises receiving what was transmitted and recovering the sequence of video frames, including the following steps: receiving the transmitted representation of the first frame $(I_1)$ and deriving the sorting permutation $P_1$ therefrom; receiving the transmitted compressed approximately sorted frame $P_1(I_2)$ and decompressing to derive the approximately sorted frame $P_1(I_2)$ therefrom; and using the inverse of the sorting permutation $P_1$ and the frame $P_1(I_2)$ to recover a representation of the second frame $I_2$, and displaying the first and second frames.

In a preferred embodiment, the transmitted representation of said first frame is an encrypted representation, which is transmitted over a secure channel. The digital pixel values can represent, for example, luminance values and/or color component values.

An embodiment of a further form of the invention is directed to a method for coding and transmitting a sequence of video frames represented by arrays of digital pixel values, and includes the following steps: coding the first frame $(I_1)$ of the sequence, and transmitting a representation of the coded first frame; decoding the coded first frame, and deriving a sorting permutation $P_1$ of the first frame; using the sorting permutation of the first frame, $P_1$, to sort the first frame $(I_1)$ and to approximately sort the second frame $(I_2)$ of the sequence, to obtain sorted frame $P_1(I_1)$ and approximately sorted frame $P_1(I_2)$, deriving a predicted version of sorted frame $P_1(I_2)$ using sorted frame $P_1(I_2)$, and encoding and transmitting the prediction error which is the difference between said predicted version of sorted frame $P_1(I_2)$ and approximately sorted frame $P_1(I_2)$. An embodiment of this form of the invention further comprises receiving what was transmitted and recovering the sequence of video frames, including the following steps: receiving the transmitted representation of the coded first frame and decoding to recover the first frame $(I_1)$; deriving a sorting permutation $P_1$ of said first frame; using the sorting permutation $P_1$ to sort the first frame to obtain sorted frame $P_1(I_1)$; receiving the encoded prediction error of sorted frame $P_1(I_2)$ and, using sorted frame $P_1(I_1)$ as a reference, recovering sorted frame $P_1(I_2)$; and using the inverse of the sorting permutation $P_1$ to approximately unsort the sorted frame $P_1(I_2)$ to recover a representation of the second frame $I_2$.

A further form of the invention is directed to a method for compressing and transmitting a sequence of video frames represented by arrays of digital pixel values, including the following steps: transmitting representations of a first frame and second frame of the sequence; deriving a first sorting permutation of a first frame difference between the first and second frames; using the first sorting permutation, to approximately sort a second frame difference between the second and third frames of the sequence, to obtain an approximately sorted second frame difference; and compressing and transmitting the approximately sorted second frame difference. In this embodiment, further steps include: deriving a second sorting permutation of the second frame difference between the second and third frames; and using the second sorting permutation to approximately sort a third frame difference between the third and fourth frames to obtain approximately sorted third frame difference; and compressing and transmitting the approximately sorted third frame difference.

A preferred embodiment of this form of the invention further comprises: receiving what was transmitted and recovering the sequence of video frames, including the following steps: receiving the transmitted representation of the first frame and second frame of the sequence and deriving therefrom a first sorting permutation of the first frame difference; receiving the transmitted compressed approximately sorted second frame difference and decompressing to derive the approximately sorted second frame difference therefrom; using the inverse of said first sorting permutation of the first frame difference and said approximately sorted second frame difference to recover a representation of the second frame difference; and deriving said third frame of the sequence from said second frame and said recovered representation of the second frame difference. In an embodiment of this form of the invention, the transmitted representation of said first frame and said second frame is an encrypted representation.

The permutation based compression hereof (with encryption, if desired) has many applications including, for example, compressing videos and image sequences. It can, for example, be used to compress medical image sequences such as cardiac MRI images that usually take large storage. Applications that support 3D and multiview video use depth information and the depth information can also be efficiently coded with the permutation based techniques hereof.

Further features and advantages of the invention will become more readily apparent from the following detailed description when taken in conjunction with the accompanying drawings.

BRIEF DESCRIPTION OF THE DRAWINGS

FIG. 1, which includes

FIG. 2, which includes

DETAILED DESCRIPTION

In one form of the invention, a method and system for video encoding and decoding uses a novel permutation transform to achieve compression of a sequence of video frames. In another form of the invention, the video is both encrypted and compressed. A novel permutation-based redundancy-preserving encryption technique is employed.

Encryption is usually a process that has a property to randomize the data. On the other hand, compression efficiency is directly dependent on the source data correlation. The more the data is correlated, the better the compression, and vice versa. One may ask the following question: Is it possible to design an encryption mechanism of reasonable security that preserves, or perhaps even improves, the redundancy of data? To Applicant's knowledge, no practical system which achieves same has heretofore been proposed. An aspect of the present invention is a novel redundancy-preserving encryption technique. A feature of the invention is that the technique is performed before compression at the encoder side, and after decompression at the decoder side. The encryption preserves, or even improves, spatial and temporal redundancies of the source data. Among the further advantages of the disclosed technique are format compliance, preservation of bitstream size, good error tolerance, and low computational complexity at the decoder.

Figure 1A:
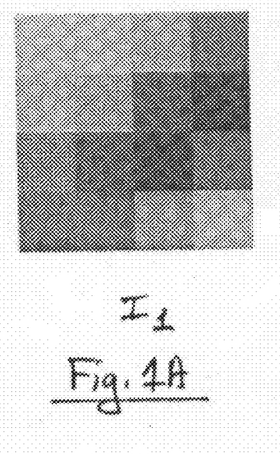
FIGS. 1A, 1B and 1C, shows a sequence of three simplified frames used in an example to illustrate operation of an embodiment of the invention.
Figure 1B:
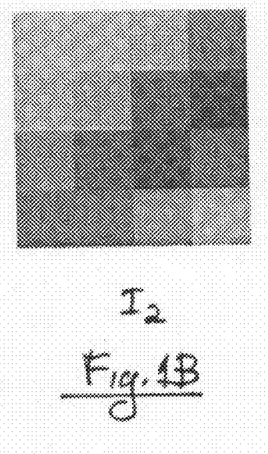
Figure 1C:
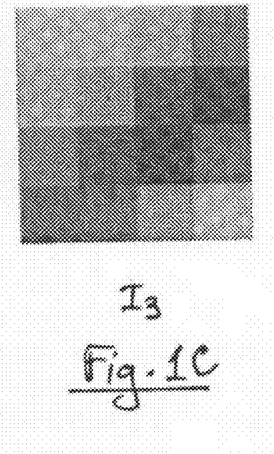

A simplified example, which illustrates operation of the technique in accordance with an embodiment of the invention, is described in conjunction with FIGS. 1A, 1B and 1C, and FIGS. 2D and 2E. In this example, consider a sequence of three simplified frames, $I_1$, $I_2$, and $I_3$, each comprising a 4×4 array of pixels. [These 4×4 frames are sub-frames taken from the center of a sequence of video test frames.] The sixteen pixel values (which are luminance values in this example, but could also be, for example, color component values) are as follows:

$$I_1: \begin{array}{cccc} 142 & 135 & 110 & 77 \\ 128 & 107 & 67 & 47 \\ 94 & 69 & 54 & 82 \\ 84 & 86 & 108 & 138 \end{array}$$

$$I_2: \begin{array}{cccc} 143 & 136 & 113 & 79 \\ 131 & 108 & 70 & 47 \\ 98 & 71 & 52 & 79 \\ 82 & 84 & 103 & 135 \end{array}$$

$$I_3: \begin{array}{cccc} 141 & 134 & 110 & 77 \\ 130 & 107 & 67 & 47 \\ 97 & 69 & 53 & 80 \\ 80 & 84 & 106 & 135 \end{array}$$

A sorting permutation, $\sigma_1$, is derived for the frame $I_1$, and a sorting permutation, $\sigma_2$, derived for the frame $I_2$. In deriving $\sigma_1$, it is seen that the smallest luminance value of $I_1$ (47) is at the $8^{th}$ position of the array, the second smallest luminance value (54) is at the $11^{th}$ position of the array, and so on. Hence, the sorting permutations $\sigma_1$ and $\sigma_2$ are:

$\sigma_1$:

8 11 7 10 4 12 13 14 9 6 15 3 5 2 16 1

$\sigma_2$:

8 11 7 10 4 12 13 14 9 15 6 3 5 16 2 1

In this example, frame $I_1$ is sent encrypted, using some standard secure channel, to serve as a key at the receiver. The receiver decrypts it and recovers frame $I_1$ from which the sorting permutation $\sigma_1$ is calculated.

Figure 2D:
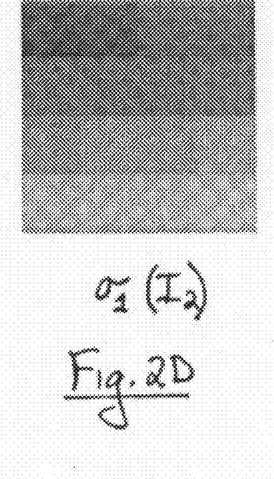
FIGS. 2D and 2E, shows encrypted sorted frames for the example of FIG. 1.
Figure 2E:
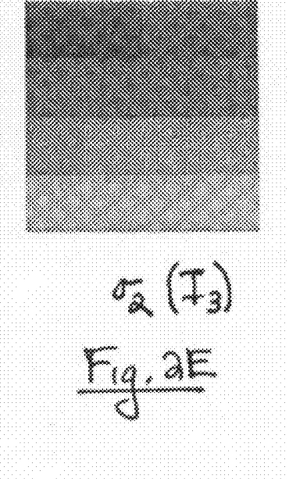

The sender then proceeds to permute each frame $I_i$ using the sorting permutation $\sigma_{i-1}$ of the previous frame $I_{i-1}$. In this example, the sender obtains encrypted frames $\sigma_1(I_2)$ and $\sigma_2(I_3)$, which are as follows:

$\sigma_1(I_2)$:

| 47  | 52  | 70  | 71  |
|-----|-----|-----|-----|
| 79  | 79  | 82  | 84  |
| 98  | 108 | 103 | 113 |
| 131 | 136 | 135 | 143 |

$\sigma_2(I_3)$:

| 47  | 53  | 67  | 69  |
|-----|-----|-----|-----|
| 77  | 80  | 80  | 84  |
| 97  | 106 | 107 | 110 |
| 130 | 135 | 134 | 141 |

These encrypted sorted frames are shown in FIGS. 2D and 2E, respectively.

The receiver always has the previous frame from which the sorting permutation can be calculated and current frame unsorted. The benefit of having the frames sent "almost sorted" is not only encryption but also compression, since sorted frames compress much better with any spatial-only video codec.

It will be understood that sorting permutations, other than the one used in examples hereof, could alternatively be employed. When the term "sorting permutation" is used in a general sense, the canonical sorting permutation can be inferred. Furthermore, permutations that approximately sort frames can be employed and are considered to be sorting permutations.

The described permutation based compression can also be applied to frame differences. In an example of this approach, two frames $I_1$ and $I_2$ are encoded and transmitted. A sorting permutation $P_1$ is derived for the frame difference, for example ($I_2-I_1$). For the next frame to be encoded, frame $I_3$, a frame difference, for example $I_3-I_2$, is computed and an approximately sorted difference image is obtained by applying $P_1(I_3-I_2)$. $P_1(I_3-I_2)$ is encoded either directly or using a prediction from sorted difference $P_1(I_2-I_1)$.

Figure 3:
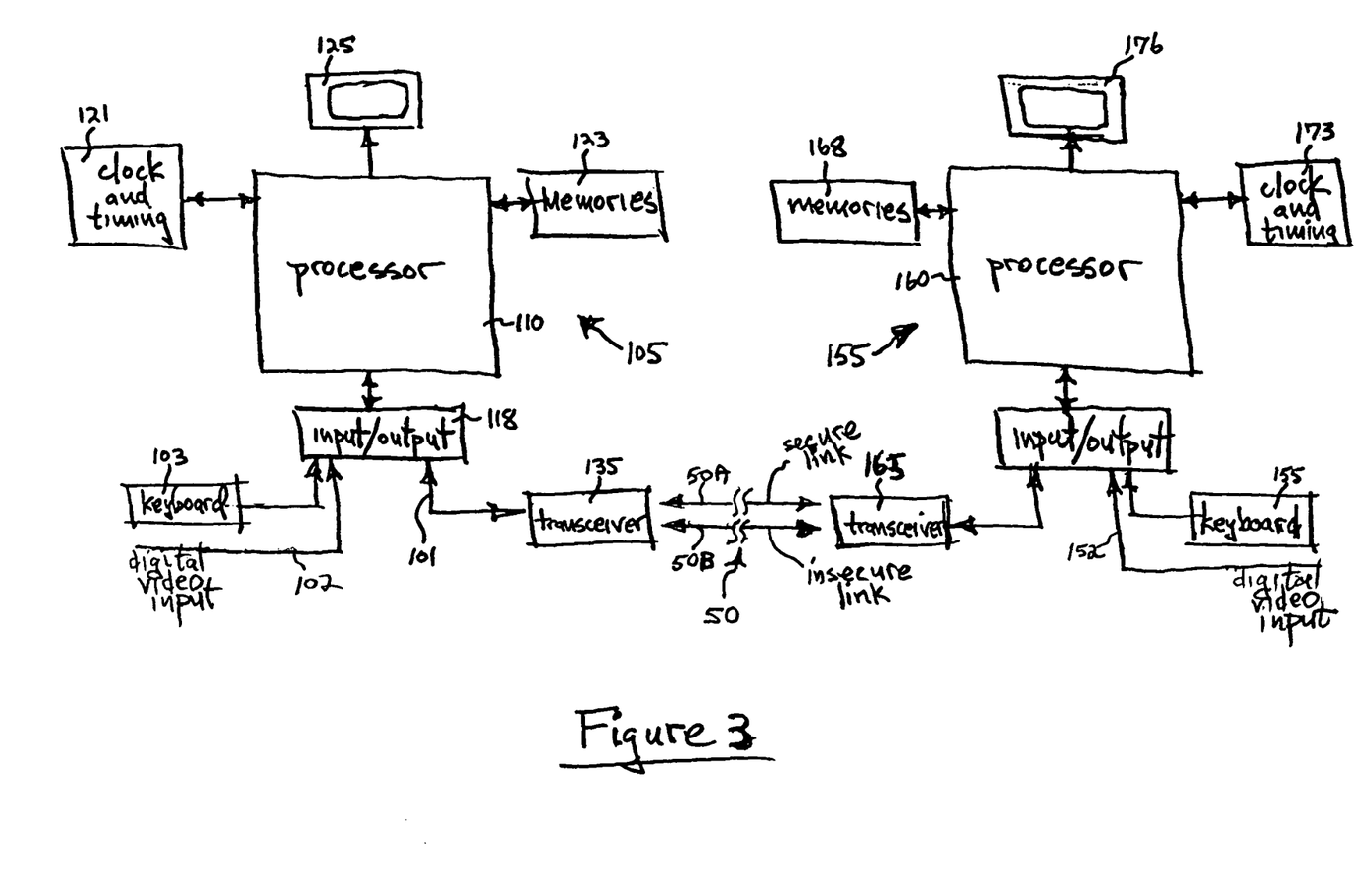
FIG. 3 is a block diagram of a type of system that can be used in practicing embodiments of the invention.

FIG. 3 is a block diagram of a type of system that can be used in practicing embodiments of the invention. Two processor-based subsystems 105 and 155 are shown as being in communication over a channel or network 50, which may be, for example, any wired or wireless communication channel such as an internet communication channel or network. In an embodiment hereof, the channel includes a secure link 50A and an insecure link 50B. The subsystem 105 includes processor 110 and the subsystem 155 includes processor 160. When programmed in the manner to be described, the processors 110 and 160 and their associated circuits can be used to implement embodiments of the invention. The processors 110 and 160 may each be any suitable processor, for example an electronic digital processor or microprocessor. It will be understood that any general purpose or special purpose processor, or other machine or circuitry that can perform the functions described herein, can be utilized. The subsystem 105 will typically include memories 123, clock and timing circuitry 121, input/output functions 118 and monitor 125, which may all be of conventional types. Inputs include a keyboard input as represented at 103 and digital video input 102, which may comprise, for example, conventional video or sequences of image-containing frames. Communication is via transceiver 135, which may comprise modems or any suitable devices for communicating signals.

The subsystem 155 in this illustrative embodiment can have a similar configuration to that of subsystem 105. The processor 160 has associated input/output circuitry 164, memories 168, clock and timing circuitry 173, and a monitor 176. Inputs include a keyboard 153 and digital video input 152. Communication of subsystem 155 with the outside world is via transceiver 165 which, again, may comprise modems or any suitable devices for communicating signals.

A further technical description of forms of the invention will be described next. Let v be a video sequence consisting of v frames denoted by $I_1, I_2, \ldots I_m$. Without loss of generality, assume that all frames in v are part of a single scene with a relatively low movement, captured with a static camera, so that the differences between adjacent frames are relatively small. Furthermore, assume that each frame has a dimension of w×h and up to $2^n$ different pixel values (colors), such that w×h>>$2^n$. By the pigeonhole principle this condition favors higher frequencies of the pixel values within a frame. Also, let $\sigma_i$ denote a sorting permutation of $I_i$, and $\sigma_i(I_i)$ denote the image with sorted pixels from $I_i$.

Two examples of the method are treated here. The first one is designed for lossless spatial-only codecs, such as Animated GIF (A-GIF), Motion PNG (M-PNG), or Motion Lossless JPEG (M-JLS), while the second one is targeted for lossy spatial-only codecs, such as Motion JPEG (M-JPEG).

Suppose Alice wishes to securely transmit a video sequence $v=I_1, I_2, \ldots, I_m$ to Bob. It is assumed that if Alice would like to transmit v to Bob non-securely, she would normally use video compression algorithm C (the encoder) and decompression algorithm D (the decoder). She opens two channels with Bob, the regular, non-secure multimedia distribution channel R, and the secure channel S where transmission data is encrypted using some standard method (e.g. AES-based protocol).

The following describes a sequence of steps for use with lossless codecs:
1. Given a video sequence $v=I_1, \ldots I_m$, Alice computes $\sigma_1$.
2. Alice calculates $D(I_1)$ and transmits it through channel S. This is the secret part (the key) of the algorithm.
3. For each next frame $I_i$, $i=2, \ldots, m$, Alice does the following:
  (a) She computes the frame $\sigma_{i-1}(I_i)$ and the permutation $\sigma_i$,
  (b) Alice then applies the standard encoder to the frame $\sigma_{i-1}(I_i)$ and transmits the encoded (compressed)-frame $C(\sigma_{i-1}(I_i))$ to Bob via regular, non-secure multimedia channel R.

At the other end, Bob performs the following decryption method in order to recover the original video sequence v.
1. Bob decodes $C(I_1)$ into $I_1$ and from it calculates a sorting permutation $\sigma_1$.
2. For each received frame $C(\sigma_{i-1}(I_i))$, $i=2, \ldots, m$, Bob does the following:
  (a) Decodes $C(\sigma_{i-1}(I_i))$ into $\sigma_{i-1}(I_i)$ and calculates $I_i=\sigma_{i-1}^{-1}(\sigma_{i-1}(I_i))$ where $\sigma_{i-1}^{-1}$ is an inverse permutation of $\sigma_{i-1}$.
  (b) Calculates a sorting permutation $\sigma_i$ from $I_i$.

The following describes a sequence of steps for use is the lossy case:
1. Given a video sequence $v=I_1, \ldots, I_m$, Alice first computes $C(I_1)$ and then $I'_1=D(C(I_1))$ from which she calculates a sorting permutation $\sigma'_1$.
2. She sends $C(I_1)$ via secure channel S to Bob.
3. Alice then applies $\sigma'_1$ to $I_2$ and computes $(C(\sigma'_1(I_2))$ which she sends via channel R to Bob.

4. Next, she computes $I''_2=D(C(\sigma'_1(I_2)))$ and then $I''_2=(\sigma'_{i-1})^{-1}(I'_2)$ from which she calculates a sorting permutation $\sigma''_2$.

5. For each next frame $I_i$, $i=3, \ldots, m$, Alice does the following:
   (a) Applies $\sigma''_{i-1}$ to $I_i$ and computes $C(\sigma''_{i-1}(I_i))$ which she sends via channel R to Bob.
   (b) Computes $I'_i=D(C(\sigma''_{i-1}(I_i)))$.
   (c) Applies $(\sigma''_{i-1})^{-1}$ to get $I''_i=(\sigma''_{i-1})^{-1}(I'_i)$.
   (d) Calculates a sorting permutation $\sigma''_i$.

At the other end, Bob performs the following decryption method to recover the original video sequence v.

1. Bob calculates $D(C(I_1))=I'_1 \approx I_1$ and calculates a sorting permutation $\sigma'_1$.
2. From $C(\sigma'_1(I_2))$ he computes $I'_2=D(C(\sigma'_1(I_2)))$
3. Bob approximates $I_2 \approx I''_2=(\sigma'_1)^{-1}(I'_2)$.
4. He then recovers a sorting permutation $\sigma''_2$.
5. For each received frame $C(\sigma''_{i-1}(I_i))$, $i=3, \ldots, m$, Bob does the following:
   (a) Decodes $C(\sigma''_{i-1}(I_i))$ into $I'_i=D(C(\sigma''_{i-1}(I_i)))$.
   (b) Approximates $I_i \approx I''_i=(\sigma''_{i-1})^{-1}(I'_i)$.
   (c) If $i<m$ he calculates a sorting permutation $\sigma''_i$ from $I'_i$.

Figure 4:
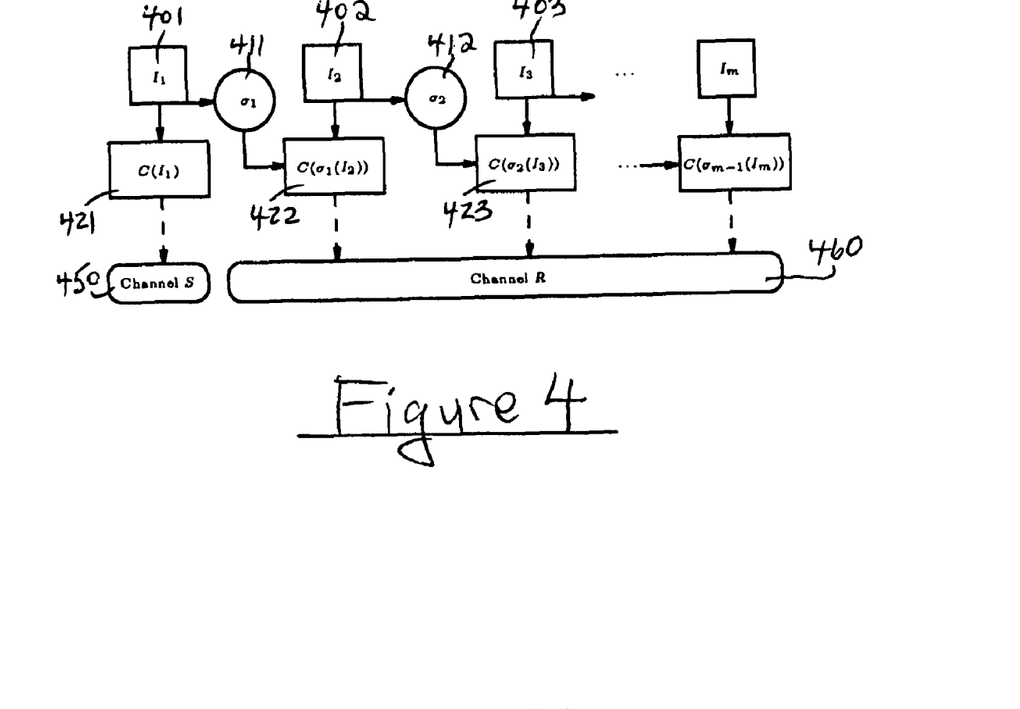
FIG. 4 is a flow diagram of a routine that can be used for controlling a processor in practicing an embodiment of the invention for encrypting a sequence of frames using a lossless codec.

FIG. 4 is a flow diagram of the method for encryption for the lossless case and shows frames $I_1, I_2 \ldots I_m$, in the blocks 401, 402, ..., on the top. The derivations of the respective sorting permutations are represented at blocks 411, 412 .... The sorting (except for the first frame) and compression is represented by blocks 421, 422, 423 .... As seen in the figure, the sorting permutations $\sigma_1$ is used to approximately sort the second frame (block 422), and so on. The secure channel is represented at block 450 and the non-secure channel is represented at page 460.

Figure 5:
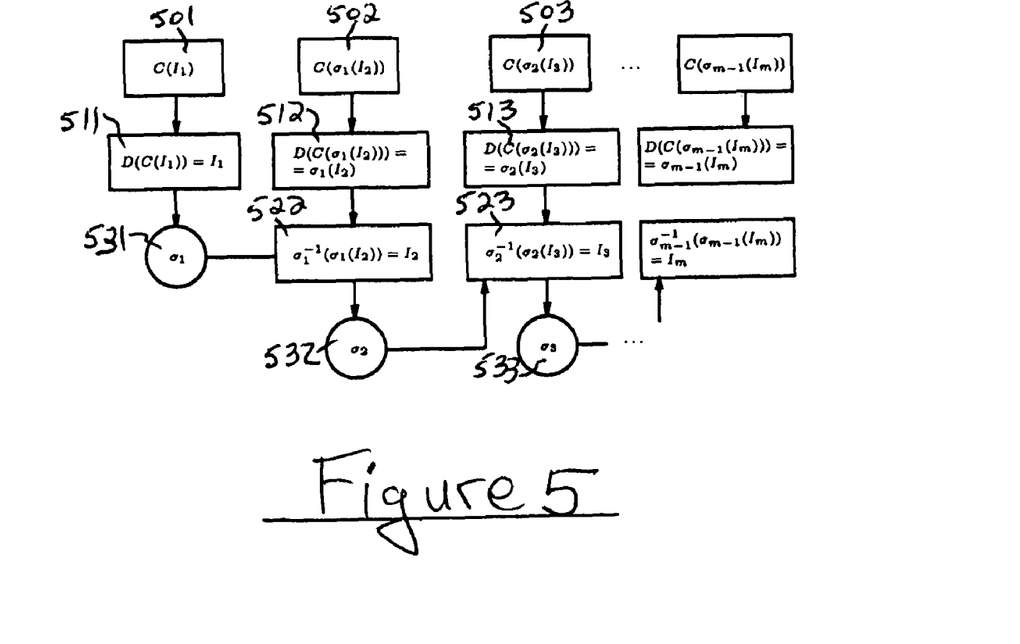
FIG. 5 is a flow diagram of a routine that can be used for controlling a processor in practicing an embodiment of the invention for decrypting a sequence of frames using a lossless codec.

FIG. 5 is a flow diagram of the method for decryption for the lossless case. The blocks 501, 502, 503 ..., show the received encoded frames. The blocks 511, 512, 513 ... represent the operations to obtain the decoded encrypted frames (except for the first frame). The block 531 represents determination of the sorting permutation for the first frame, and the blocks 522, 523, ..., represent application of the inverse permutations to recover the frames. The blocks 532, 533, ..., represent the derivation of the sorting permutations from the respectively derived frames, the inverse of each such derived sorting permutation being used, as shown for recovery of the next frame.

Figure 6:
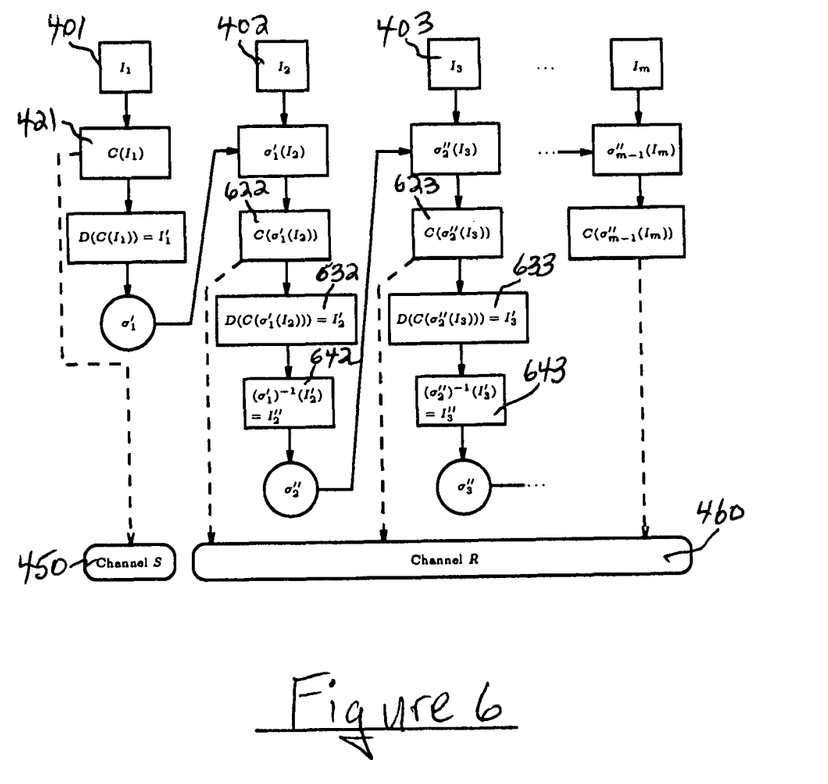
FIG. 6 is a flow diagram of a routine that can be used for controlling a processor in practicing an embodiment of the invention for encrypting a sequence of frames using a lossy codec.

FIG. 6 is a flow diagram of the method for encryption for the lossy case. The diagram is similar to that of the lossless case of FIG. 4, except that the frame $I_1$ is coupled to the secure channel, and the encoded sorted frames $C(\sigma'_1(I_2))$, $C(\sigma''_2(I_3))$, etc. (blocks 622, 623, etc.) are coupled to the non-secure channel R. The two additional rows of blocks (632, 633, etc. and 642, 643, etc.) represent the steps for deriving $\sigma''_2$, $\sigma''_3$ ..., as described in step (5) above for the lossy case encryption.

Figure 7:
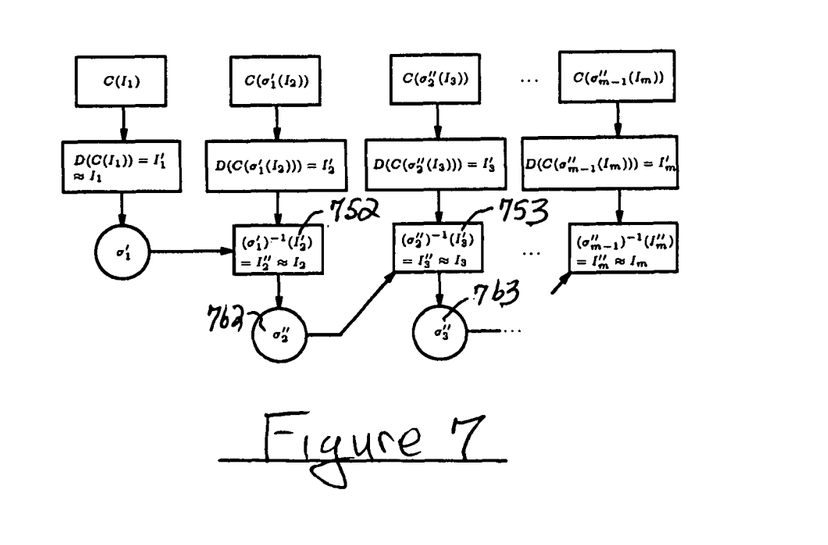
FIG. 7 is a flow diagram of a routine that can be used for controlling a processor in practicing an embodiment of the invention for decrypting a sequence of frames using a lossy codec.

FIG. 7 is a flow diagram of the decryption method for the lossy case. The diagram is generally similar to the method for the lossless case of FIG. 5, except that, here, the recovered approximate frames are $I''_1, I'_2, I''_3, \ldots$, (blocks 752, 753, etc.) and the derived sorting permutations (the inverse of which are used in each next stage) area, $\sigma'_1, \sigma''_2, \sigma''_3 \ldots$, (blocks 762, 763, etc.), as described in step (5) above for the lossy case decryption.

Reference can be made to D. Socek, et al., September, 2006, supra, incorporated herein by reference, for further details.

The invention claimed is:

1. A method for compressing and transmitting a sequence of video frames represented by arrays of digital pixel values, comprising the steps of:
   transmitting a representation of a first frame ($I_1$) of the sequence;
   deriving a sorting permutation $P_1$ of said first frame;
   using the sorting permutation of the first frame, $P_1$, to approximately sort a second frame ($I_2$) of the sequence, to obtain approximately sorted frame $P_1(I_2)$; and
   compressing and transmitting the approximately sorted frame $P_1(I_2)$.

2. The method as defined by claim 1, further comprising the steps of:
   deriving a sorting permutation $P_2$ of said second frame;
   using the sorting permutation of the second frame, $P_2$, to approximately sort a third frame ($I_3$) of the sequence, to obtain approximately sorted frame $P_2(I_3)$; and
   compressing and transmitting the approximately sorted frame $P_2(I_3)$.

3. The method as defined by claim 2, further comprising the steps of:
   deriving a sorting permutation $P_n$ of an $n^{th}$ frame of the sequence;
   using the sorting permutation of the $n^{th}$ frame, $P_n$, to approximately sort an $(n+1)^{th}$ frame ($I_{n+1}$) of the sequence; and
   compressing and transmitting the approximately sorted frame $P_n(I_{n+1})$.

4. The method as defined by claim 1, further comprising receiving what was transmitted and recovering the sequence of video frames, comprising the steps of:
   receiving the transmitted representation of the first frame ($I_1$) and deriving the sorting permutation $P_1$ therefrom;
   receiving the transmitted compressed approximately sorted frame $P_1(I_2)$ and decompressing to derive the approximately sorted frame $P_1(I_2)$ therefrom; and
   using the inverse of sorting permutation $P_1$ and the frame $P_1(I_2)$ to recover a representation of the second frame $I_2$.

5. The method as defined by claim 1, wherein said transmitted representation of said first frame is an encoded representation.

6. The method as defined by claim 4, wherein said transmitted representation of said first frame is an encoded representation, and wherein the received representation of the first frame is decoded to recover said first frame ($I_1$).

7. The method as defined by claim 5, wherein said encoded representation of said first frame is an encrypted representation.

8. The method as defined by claim 6, wherein said encoded representation of said first frame is an encrypted representation.

9. The method as defined by claim 7, wherein said encrypted representation is transmitted over a secure channel.

10. The method as defined by claim 1, wherein said digital pixel values represent luminance values.

11. The method as defined by claim 1, wherein said digital pixel values represent color component values.

12. The method as defined by claim 4, further comprising displaying the first frame and the second frame.

13. A method for coding and transmitting a sequence of video frames represented by arrays of digital pixel values, comprising the steps of:
   coding the first frame ($I_1$) of the sequence, and transmitting a representation of the coded first frame;
   decoding the coded first frame, and deriving a sorting permutation $P_1$ of the first frame;
   using the sorting permutation of the first frame, $P_1$, to sort the first frame ($I_1$) and to approximately sort the second frame ($I_2$) of the sequence, to obtain sorted frame $P_1(I_1)$ and approximately sorted frame $P_1(I_2)$, deriving a predicted version of sorted frame $P_1(I_2)$ using sorted frame $P_1(I_1)$, and encoding and transmitting the prediction error which is the difference between said predicted version of sorted frame $P_1(I_2)$ and approximately sorted frame $P_1(I_2)$.

14. The method as defined by claim 13, further comprising receiving what was transmitted and recovering the sequence of video frames, comprising the steps of:

receiving the transmitted representation of the coded first frame and decoding to recover the first frame $(I_1)$;

deriving a sorting permutation $P_1$ of said first frame;

using the sorting permutation $P_1$ to sort the first frame to obtain sorted frame $P_1(I_1)$;

receiving the encoded prediction error of sorted frame $P_1(I_2)$ and, using sorted frame $P_1(I_1)$ as a reference, recovering sorted frame $P_1(I_2)$; and using the inverse of sorting permutation $P_1$ to approximately unsort the sorted frame $P_1(I_2)$ to recover a representation of the second frame $I_2$.

15. A method for encrypting, compressing, and transmitting a sequence of video frames represented by arrays of digital pixel values, comprising the steps, at a sender's end, of:

transmitting an encrypted representation of a first frame $(I_1)$ of the sequence;

deriving a sorting permutation $P_1$ of said first frame;

using the sorting permutation of the first frame, $P_1$, to approximately sort a second frame $(I_2)$ of the sequence, to obtain approximately sorted frame $P_1(I_2)$; and compressing and transmitting the approximately sorted frame $P_1(I_2)$.

16. The method as defined by claim 15, further comprising the steps, at the sender's end, of:

deriving a sorting permutation $P_2$ of said second frame;

using the sorting permutation, $P_2$, of the second frame, $(I_2)$, to approximately sort a third frame $(I_3)$ of the sequence, to obtain approximately sorted frame $P_2(I_3)$; and compressing and transmitting the approximately sorted frame $P_2(I_3)$.

17. The method as defined by claim 15, further comprising the steps, at the sender's end, of:

deriving a sorting permutation $P_n$ of an nth frame $(I_n)$ of the sequence;

using the sorting permutation, Pn, of the $n^{th}$ frame, $(I_n)$, to approximately sort an $(n+1)^{th}$ frame $(I_{n+1})$ of the sequence; and compressing and transmitting the sorted frame $P_n(I_{n+1})$.

18. The method as defined by claim 15, further comprising receiving what was transmitted and recovering the sequence of video frames, comprising the steps of:

decrypting the encrypted first frame to recover the first frame $(I_1)$, and deriving the sorting permutation $P_1$ therefrom;

receiving the transmitted compressed sorted frame $P_1(I_2)$ and decompressing to derive the sorted frame $P_1(I_2)$ therefrom; and using the inverse of sorting permutation $P_1$ to approximately unsort the approximately sorted frame $P_1(I_2)$ to recover a representation of the second frame $I_2$.

19. The method as defined by claim 18, wherein said encrypted representation is transmitted over a secure channel.

20. In a method for compressing and transmitting a sequence of video frames represented by arrays of digital pixel values, that includes the steps of: transmitting a representation of a first frame $(I_1)$ of the sequence; deriving a sorting permutation $P_1$ of said first frame; using the sorting permutation of the first frame, $P_1$, to approximately sort a second frame $(I_2)$ of the sequence, to obtain approximately sorted frame $P_1$ $(I_2)$; and compressing and transmitting the approximately sorted frame $P_1(I_2)$; a method for receiving what was transmitted and recovering the sequence of video frames, comprising the steps of:

receiving the transmitted representation of the first frame $(I_1)$ and deriving the sorting permutation $P_1$ therefrom;

receiving the transmitted compressed approximately sorted frame $P_1(I_2)$ and decompressing to derive the approximately sorted frame $P_1(I_2)$ therefrom; and using the inverse of sorting permutation $P_1$ to approximately unsort the sorted frame $P_1(I_2)$ to recover a representation of the second frame $I_2$.

21. The method as defined by claim 20, wherein said transmitted representation of said first frame is an encoded representation, and wherein the received representation of the first frame is decoded to recover said first frame $(I_1)$.

22. The method as defined by claim 20, wherein said encoded representation of said first frame is an encrypted representation.

23. The method as defined by claim 22, wherein said encrypted representation is transmitted over a secure channel.

24. The method as defined by claim 20, wherein said second frame $(I_2)$ is recovered losslessly.

25. A method for compressing and transmitting a sequence of video frames represented by arrays of digital pixel values, comprising the steps of:

transmitting representations of a first frame and second frame of the sequence;

deriving a first sorting permutation of a first frame difference between the first and second frames;

using the first sorting permutation, to approximately sort a second frame difference between the second and third frames of the sequence, to obtain an approximately sorted second frame difference; and compressing and transmitting the approximately sorted second frame difference.

26. The method as defined by claim 25, further comprising the steps of:

deriving a second sorting permutation of the second frame difference between the second and third frames; and using the second sorting permutation to approximately sort a third frame difference between the third and fourth frames to obtain approximately sorted third frame difference; and compressing and transmitting the approximately sorted third frame difference.

27. The method as defined by claim 25, further comprising receiving what was transmitted and recovering the sequence of video frames, comprising the steps of:

receiving the transmitted representation of the first frame and second frame of the sequence and deriving therefrom a first sorting permutation of the first frame difference;

receiving the transmitted compressed approximately sorted second frame difference and decompressing to derive the approximately sorted second frame difference therefrom;

using the inverse of said first sorting permutation of the first frame difference and said approximately sorted second frame difference to recover a representation of the second frame difference; and deriving said third frame of the sequence from said second frame and said recovered representation of the second frame difference.

28. The method as defined by claim 27, wherein said transmitted representation of said first frame and said second frame is an encrypted representation.

29. A method for compressing and storing a sequence of image-containing frames represented by arrays of digital pixel values, comprising the steps of:
 storing a representation of a first frame ($I_1$) of the sequence;
 deriving a sorting permutation $P_1$ of said first frame;
 using the sorting permutation of the first frame, $P_1$, to approximately sort a second frame ($I_2$) of the sequence, to obtain approximately sorted frame $P_1(I_2)$; and
 compressing and storing the approximately sorted frame $P_1(I_2)$.

30. The method as defined by claim 29, further comprising the steps of:
 deriving a sorting permutation $P_2$ of said second frame;
 using the sorting permutation of the second frame, $P_2$, to approximately sort a third frame ($I_3$) of the sequence, to obtain approximately sorted frame $P_2(I_3)$; and
 compressing and storing the approximately sorted frame $P_2(I_3)$.

31. The method as defined by claim 4, wherein said digital pixel values represent luminance values.

32. The method as defined by claim 4, wherein said digital pixel values represent color component values.

33. The method as defined by claim 1, wherein the steps of said method are performed using a processor-based subsystem.

* * * * *